April 4, 1950
B. C. HARRIS
2,502,622
TILTING CAB
Filed July 28, 1948
2 Sheets-Sheet 1
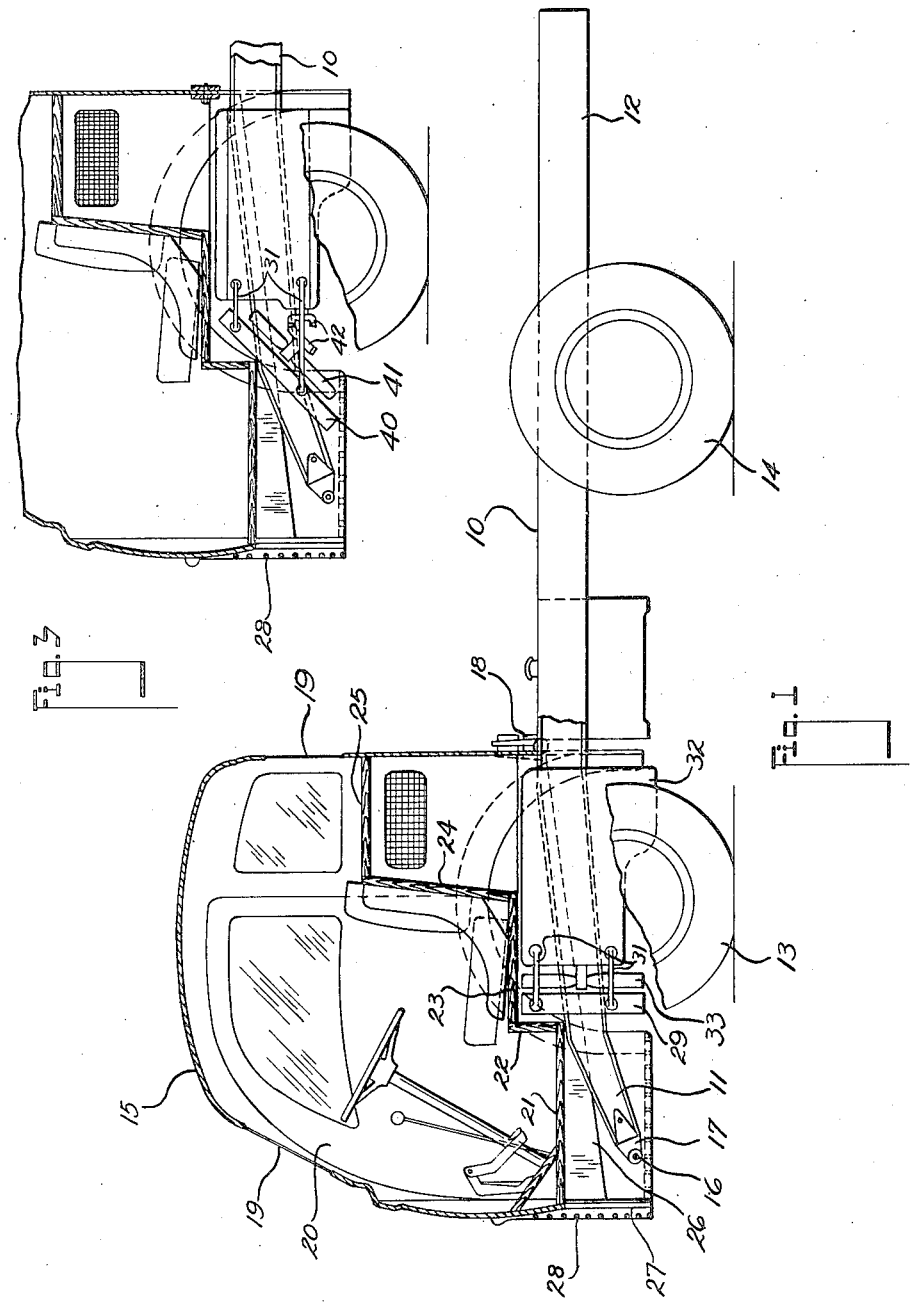
INVENTOR.
BERT C. HARRIS
BY Richey & Watts
ATTORNEYS April 4, 1950  B. C. HARRIS  2,502,622
TILTING CAB
Filed July 28, 1948  2 Sheets-Sheet 2
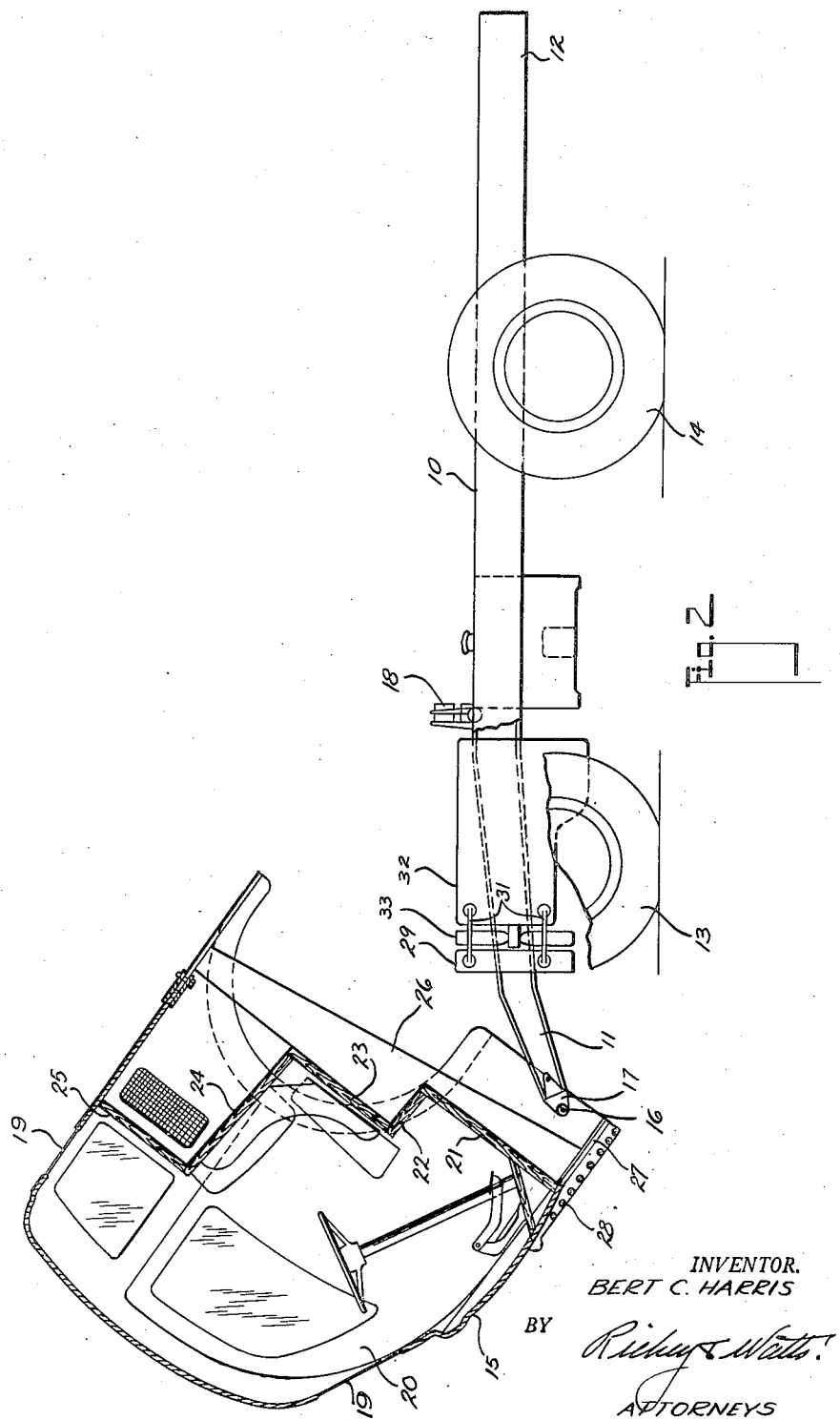
INVENTOR.
BERT C. HARRIS
BY
Richey & Watts
ATTORNEYS Patented Apr. 4, 1950

2,502,622

UNITED STATES PATENT OFFICE 2,502,622

TILTING CAB

Bert C. Harris, Cleveland, Ohio, assignor to The White Motor Company, Cleveland, Ohio, a corporation of Ohio Application July 28, 1948, Serial No. 41,019

4 Claims. (Cl. 180—89)

This invention relates broadly to motor vehicles and more specifically to improvements in the construction and arrangement of the cab, power plant, and accessories associated therewith.

Commercial trucks known as the "cab-over-engine" type have been found, during the past decade of use, to possess many objectionable features which have prevented this type of vehicle from being adaptable for universal use in the commercial trucking industry. Foremost among the objections has been the height of the floor in the cab above the curb level. Another objection has been that of the driver's comfort, which, quite generally, has been impaired by the protrusion of the engine housing above the floorboard level of the cab.

In the conventional "cab-over-engine" truck, the location of the engine and its accessories, including the radiator fan, air cleaners, carburetors, etc., has by necessity caused excessive height of the cab floor level above the curb. This type of structure has been found to be a great deal more expensive to maintain than the conventional type of truck, inasmuch as it entailed a great deal of labor to dismantle the cab or subassemblies thereof in anticipation of adjustments or repairs to the engine. It was therefore a marked step in the advance of the art when Herbert Spear invented and perfected the tilting cab, Patent No. 2,148,308 and Patent No. 2,306,348. With his construction the operator could rock the cab forwardly away from the engine and thus gain free access to the power plant and the accessorial parts thereof. Although the tilting cab mitigated the problem of maintenance, the excessive height of the cab from the curb and the cramped working conditions within the cab still remained.

The present invention is directed to a still further advance in the art of the so-called cab-over-engine type of vehicle and contemplates the combined advantage of a driver's low entry, a free unobstructed cab floor, a commodious cab interior, and free accessibility to the engine. A radical improvement by the way of low cab entry for the driver and ready accessibility to the engine of a cab-over-engine vehicle was made by Bert C. Harris and disclosed in Patent No. 2,396,506. The present invention constitutes an improvement over the Harris patent and has as its primary object the provision of a design which utilizes a forward-tilting cab surmounting an engine, radiator and fan supported on the forward end of a low drop frame chassis in such a manner as to permit easy ingress to and egress from the cab and at the same time provide ready access to the engine and its accessories when the cab is tilted forward.

Another object of the present invention is to permit maximum accessibility to the engine and its accessories by mounting the cab in a manner which will permit it to tilt forwardly and completely away from the engine and its said accessories.

Another object of the invention resides in the unique arrangement of the engine, radiator and fan in relation to the cab so as to afford low entry, commodius cab accommodations, and accessibility to engine and accessories when the cab is in its tilted position.

Another object of the invention is to provide a unique vehicle cab structure which may be used as a cab for a truck-tractor or a cab for a truck having a conventional body associated therewith.

Another object of the invention is to provide a novel type of vehicle cab which will increase safety of operation through improved visibility for the driver.

A still further advantage of the invention resides in the provision of a flat level floor for a cab and a low driver's entrance.

Another object of the present invention resides in the arrangement of the cab, the engine, radiator, and fan, in respect to one another, so as to permit optimum free passage of air to the heat exchange system.

Another object of the invention is to eliminate the conventional engine housing protrusion in the floor of the cab by mounting the engine, radiator, and fan under and behind the cab seat.

Other objects and advantages more or less ancillary to the foregoing, and the manner in which all the various objects are realized, will appear in the following description, which, considered in connection with the accompanying drawings, sets forth the preferred embodiment of the invention.

Referring to the drawings:

Fig. 1 is a longitudinal sectional view, shown somewhat diagrammatically, of the improved vehicle illustrating the novel arrangement of the floor, doors, seat, radiator, and engine;

Fig. 2 is a similar view of the vehicle illustrating the cab in its tilted position; and Fig. 3 is a sectional view of a fragmentary portion of the cab and chassis illustrating an alternate arrangement of the radiator.

Referring first to Fig. 1, the vehicle comprises a chassis frame 10 formed with a downwardly inclined forward end section 11 and a straight horizontal load-supporting portion 12. The front wheels 13 are mounted with the usual springs and axle in spaced relation with the forward end of the frame and rearwardly of the inclined section 11. The rear wheels 14 are mounted on the rearward portion of the frame and are driven by the engine in the conventional manner.

A cab 15 having the usual steering gear and control pedals therein is pivoted upon a tie rod 16 mounted in bearing brackets 17 in the forward ends of the frame. The cab is secured in its lowered position by a latch 18 supported on a frame cross member and is tilted and retained in its tilted position by any suitable means such as elevating jacks (not shown) disposed between the cab and the frame. The steering gear, brake, clutch, and other control elements for the vehicle are coupled with their respective operating mechanisms through articulated linkage which is designed to fulcrum in the axis of the pivot 16 in order to avoid separation of the connecting parts during the tilting movement of the cab. Since the control elements and linkage therefor form per se no part of the present invention, further description and a more explicit disclosure thereof is deemed unnecessary herein.

The cab is generally of prismoidal form having front and rear view windows 19 therein and side panel doors 20 hinged adjacent the front of the cab and disposed generally forward of the front wheels 13. The cab is further constructed with a flat level floor 21 in the forward end thereof which is mounted above and adjacent the forward inclined section 11 of the frame and below the plane of the straight rearward portion 10 thereof. The rearward end of the floor terminates forwardly of the front circumferential edges of the front wheels, and the upper face thereof is substantially tangential to the tire rims of the wheels. The position of the floor affords an entry to the cab which is but slightly greater in height than the level of the average curb and well below the height of the floor in other commercial vehicles. The rear end of the floor abuts a transverse plate 22 constituting a riser for a seat platform 23 formed with a back panel 24 which is preferably supported by a horizontal ledge 25 secured to the rear wall of the cab. The back of the seat is arranged in aligned relation with the generally vertical portions of the rearward edges of the doors 20 so that entry to the cab may be attained by the driver with ease and dispatch. The cab is framed with sill members 26 arranged in parallel relation with the side rails of the chassis frame 10 and adjacent the outer sides thereof. The front panel of the cab is formed with an opening 27 having a grill 28 therein of a width equal to the dimension between the sill members and of a height approximately equal to the dimension from the lower face of the floor 21 to the lower marginal edge of the cab.

The radiator 29, as shown in Fig 1, is mounted in a vertical position beneath the seat 23 with the upper portion thereof in proximity with the seat and riser 22 and with the lower portion thereof depending below the side rails of the frame 10. The radiator is supported by arms 31 affixed thereto and to the engine 32 which is mounted rearwardly thereof in the plane of the medial axis of the chassis. The engine is supported by the side rails of the frame and a fan 33 is interposed between the forward end thereof and the rearward face of the radiator. The top of the engine protrudes above the top of the frame, and the engine, fan, and radiator are laterally straddled by the sills 26 of the cab and are recessed into cross partitions 22 and 23 therein.

It will be seen that when the cab is lowered to its operative position, as shown in Fig. 1, the cab sills 26 and the floor 21 will form a channel which will direct the air taken through the grill to the radiator, and the sills 26 will also deflect laterally splashed or moving dirt and other foreign matter from the face of the radiator.

In some installations it may be desirable to provide an increased cooling area for the engine. As illustrated in Fig. 3, the radiator 40 is inclined rearwardly with the lower portion thereof below the floor and the top within the void formed by the sills and seat. The fan 41 in this organization is mounted in parallel relation to the rearward face of the radiator and driven by the engine through bevel gearing 42. The modified radiator mounting, as disclosed above, may be employed in such installations as require a heat exchanger of more liberal proportions than customarily used in normal commercial operation.

From the foregoing it will be recognized that the improved arrangement of the frame, cab, engine and radiator will accommodate the construction of a low flat uninterrupted floor substantially level with a curb, also the design of the doors with the trailing edge thereof even with the back of the seat contributes to the ease of entry to the cab, and the arrangement of the doors forwardly of the wheels further contributes to the ease of entry to the cab. The arrangement of the floor, seat, and rear ledge affords a commodious cab interior, and the combination of these refinements and the improved orientation thereof provides a cab which may be repeatedly entered and left by the driver without untoward effort and fatigue.

It will further be recognized that the position of the cab sills as contemplated herein will provide an efficient air channel for the radiator and an effective shield which will be retracted from the engine assembly when the cab is tilted forwardly to accommodate motor adjustments, renewals, or repairs.

Although the foregoing description is necessarily of a detailed character, in order that the invention may be completely set forth, it is to be understood that the specific terminology therein is not intended to be restrictive or confining, and that various rearrangements of parts and modifications of detail may be resorted to without departing from the scope or spirit of the invention as herein claimed.

I claim:

1. A motor truck comprising a chassis including a frame having a load-carrying section and a downwardly extending forward section, said chassis including front and rear wheels with the front wheels spaced a substantial distance rearwardly of the forward end of said frame, a cab having front, rear and side walls, said cab being pivotally mounted for forward tilting on the forward portion of said frame, said cab having a floor extending laterally across the forward portion of the cab, with said floor being forward of and below the top of said front wheels as well as below the load-carrying section of said frame, a riser extending upwardly from the rear of said floor, seat supporting means extending rearwardly from said riser, the height of said means above the ground not substantially exceeding the height of the periphery of said front wheels, a seat on said seat supporting means, and an engine, fan, and radiator assembly mounted medially of said frame, said fan and radiator being not substantially higher than the forward portion of said engine; said fan, radiator, and the forward engine portion being disposed beneath and adjacent to said seat supporting means and rearwardly of said riser.

2. A motor truck comprising a chassis including a frame having a load-carrying section and a downwardly extending forward section, said chassis including front and rear wheels with the front wheels spaced a substantial distance rearwardly of the forward end of said frame, a cab having front, rear and side walls, said cab being pivotally mounted for forward tilting on the forward portion of said frame, said cab having a floor extending laterally across the forward portion of the cab, with said floor being forward of and below the top of said front wheels as well as below the load-carrying section of said frame, a riser extending upwardly from the rear of said floor, seat supporting means extending rearwardly from said riser, the height of said means above the ground not substantially exceeding the height of the periphery of said front wheels, a seat on said seat supporting means, and an engine, fan, and radiator assembly mounted medially of said frame, said fan and radiator being not substantially higher than the forward portion of said engine; said fan, radiator, and the forward engine portion being disposed beneath and adjacent to said seat supporting means and rearwardly of said riser, and an opening formed in the front wall of said cab with a substantial portion thereof disposed below the forward floor of the cab.

3. A motor truck comprising a chassis including a frame having a load-carrying section and a downwardly extending forward section, said chassis including front and rear wheels with the front wheels spaced a substantial distance rearwardly of the forward end of said frame, a cab having front, rear and side walls, said cab being pivotally mounted for forward tilting on the forward portion of said frame, said cab having a floor extending laterally across the forward portion of the cab, with said floor being forward of and below the top of said front wheels as well as below the load-carrying section of said frame, a riser extending upwardly from the rear of said floor, seat supporting means extending rearwardly from said riser, the height of said means above the ground not substantially exceeding the height of the periphery of said front wheels, a seat on said seat supporting means, and an engine, fan, and radiator assembly mounted medially of said frame in a lateral direction and extending from a plane below the frame to a plane above the frame; said fan, radiator, and the forward engine portion being disposed beneath and adjacent to said seat supporting means and disposed rearwardly of said riser.

4. A motor truck comprising a chassis including a frame having a load-carrying section and a downwardly extending forward section, said chassis including front and rear wheels with the front wheels spaced a substantial distance rearwardly of the forward end of said frame, a cab having front, rear and side walls, said cab being pivotally mounted for forward tilting on the forward portion of said frame, said cab having a floor extending laterally across the forward portion of the cab, with said floor being forward of and below the top of said front wheels as well as below the load-carrying section of said frame, a riser extending upwardly from the rear of said floor, seat supporting means extending rearwardly from said riser, the height of said means above the ground not substantially exceeding the height of the periphery of said front wheels, a seat on said seat supporting means, and an engine, fan, and radiator assembly mounted medially of said frame in a lateral direction and extending from a plane below the frame to a plane above the frame; said fan, radiator, and the forward engine portion being disposed beneath and adjacent to said seat supporting means and disposed rearwardly of said riser, sills extending downwardly from said floor adjacent the sides of said frame, said sills, frame, and floor cooperating to form a channel for delivery of air to said radiator, and an opening formed in the front wall of said cab with a substantial portion thereof disposed below the forward floor of the cab.

BERT C. HARRIS.

REFERENCES CITED

The following references are of record in the file of this patent:

UNITED STATES PATENTS

| Number | Name | Date |
|---|---|---|
| D. 151,580 | Ash | Nov. 2, 1948 |
| 1,584,292 | Hawn | May 11, 1926 |
| 2,141,267 | Dillon | Dec. 27, 1938 |
| 2,154,011 | Reinoehl et al. | Apr. 11, 1939 |
| 2,306,348 | Spear | Dec. 22, 1942 |
| 2,376,491 | Kinney, Jr. | May 22, 1945 |